July 23, 1968 C. H. HEUER 3,394,319
VIDEO BAND-PASS CONTROL
Filed May 26, 1964
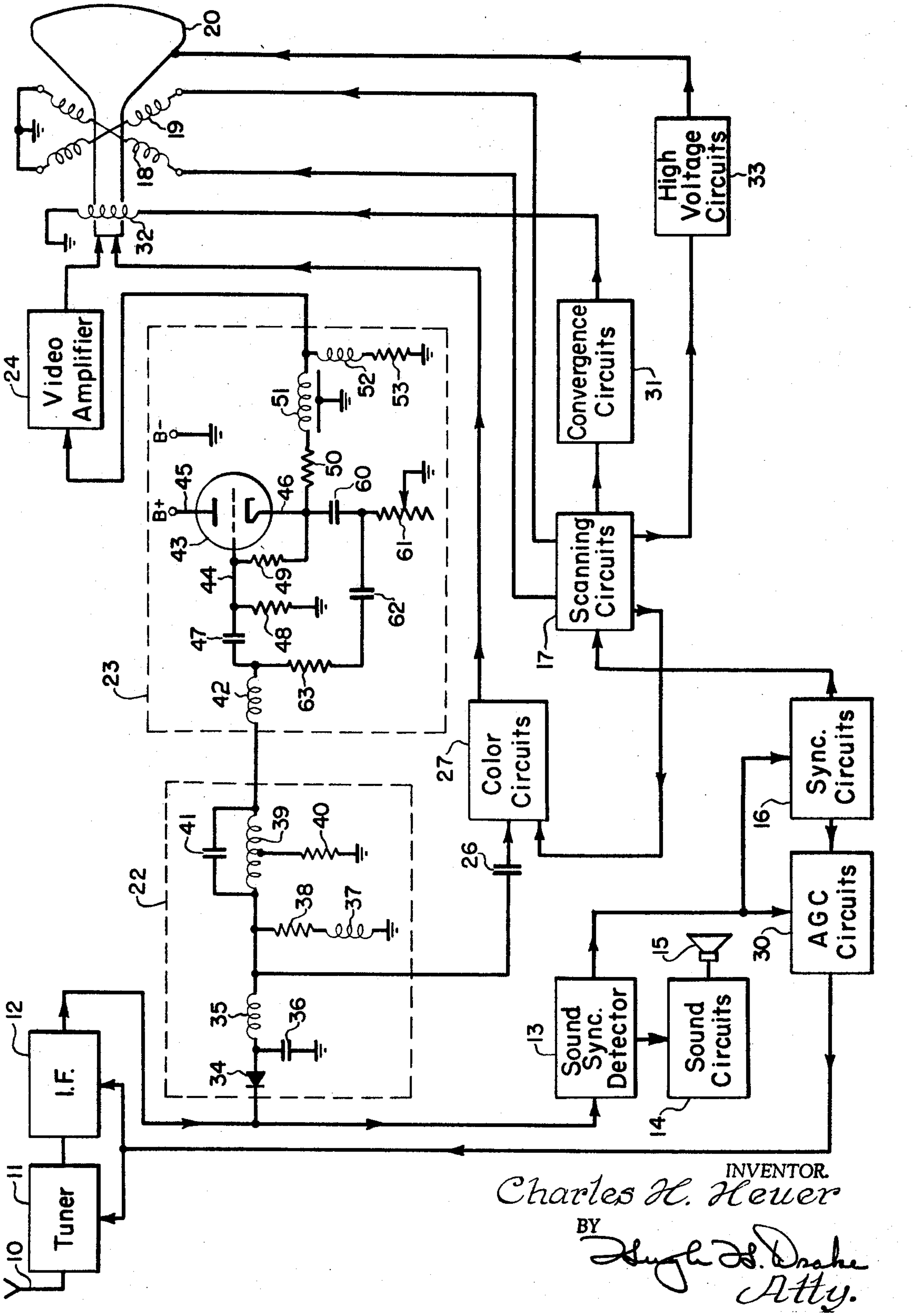
INVENTOR
Charles H. Heuer
BY
Hugh H. Drake
Atty.

United States Patent Office 3,394,319
Patented July 23, 1968

3,394,319

VIDEO BAND-PASS CONTROL

Charles H. Heuer, Glencoe, Ill., assignor to Zenith Radio Corporation, Chicago, Ill., a corporation of Delaware Filed May 26, 1964, Ser. No. 370,211
4 Claims. (Cl. 330—172)

ABSTRACT OF THE DISCLOSURE

To provide a picture control for attenuating the band pass and thus somewhat smearing the picture under noisy signal conditions, an adjustable impedance is coupled to both the input and output circuits of a video amplifier for simultaneously permitting variation of attenuation of signal energy in both circuits. In the particular embodiment, the impedance simultaneously adjusts a frequency-dependent shunt across the output circuit and a variable damping load on a peaking element in the input circuit.

The present invention relates to television receivers. More particularly, it pertains to video amplifier circuitry useful in such receivers.

In a typical present-day television receiver, the monochrome portion of the composite television signal is translated through one or more stages of video amplification. The monochrome signal is also the luminance or brightness portion of the total composite signal utilized to reproduce a color television program. One general prerequisite for the video amplification stages is that their band-pass characteristic be adequate to insure accurate translation of the high frequency components of the monochrome information. For a given input signal, it is possible using ordinary techniques to establish the band-pass characteristic in a manner to give a desired quality to the reproduced image.

It has been found that variations which occur in the received signal cause corresponding variations in what would be the desired band-pass characteristic of the video amplification stages. Such variations in the received signal may occur because of changes, from time to time or from one channel to another, in studio operations, transmitter adjustments, over-the-air transmission paths or, possibly an apparent signal change occurring by reason of variation in receiver component values. When, during reception of a particular program, conditions are such that the signal-to-noise ratio is good, translation of the high-frequency video content affords a crisp picture which usually is most pleasing. But when the noise level is higher, the viewer often prefers the picture which results when the high-frequency content is somewhat attenuated; the effect is to "smear" the noise so as to render it less objectionable in the usual case.

It is, therefore, desirable to provide an adjustable control in the receiver, preferably one which may be operated by the viewer, to permit a variation of the band-pass characteristic so as to permit optimizing the reproduced picture. Such "peak picture" controls have been employed heretofore. One control for this purpose utilizes adjustable peaking coils in the video amplifier channel in order to permit variation of the overall band-pass characteristic by establishing resonance at and around frequencies of desired enhancement or attenuation. However, these approaches are generally inadequate because the video-frequency signal impedances involved are high, as a result of which undesired stray capacitance effects and variable delays are encountered when the associated leads are brought to a position convenient for customer operation.

One very attractive video amplification arrangement utilizes a cathode follower fed from the video detector and, in turn, feeding a video output stage through the delay line which is customarily included to compensate for signal delay inherent in the color processing stages of the receiver. The cathode follower stage facilitates good termination of the sending end of the delay line in its characteristic impedance and provides isolation between the detector and the delay line. A known picture control, useful in this and other video amplifier arrangements, employs a selectable value of capacitance shunted across a rheostat in the video output stage cathode lead and serving as the picture contrast control. A disadvantage of tihis control is that the degree of video peaking varies with adjustment of the contrast setting.

It is a general object of the present invention to provide an amplifier having utility in the foregoing environment and which overcomes the aforenoted disadvantages and deficiencies.

Another object of the present invention is to provide an amplifier in which the number of components necessary for achieving peak-picture control are minimized while affording superior customer convenience and satisfaction.

A specific object of the present invention is to provide a video amplifier for a color receiver in which the high-frequency portion of the band-pass characteristic is adjustable to suit the user and in which the adjustment is accomplished in the manner avoiding adverse effects upon other characteristics or upon other portions of the receiver.

In accordance with the invention, a cathode-follower amplifier stage comprises an amplifier device having an input, an output and a common electrode. Input circuit means including a peaking element coupled to the input electrode are provided for applying a signal to the amplifier device, the peaking element establishing a condition of resonance in the circuit means to accentuate a predetermined portion of the frequency spectrum of the applied signal. An output load impedance connected between the common electrode and a plane of reference potential is provided for deriving and output signal from the amplifier, and means serially comprising a capacitor and an adjustable impedance connected across the output load impedance establish an adjustable frequency-dependent shunt across the output load to vary the high-frequency content of the output signal. Means including a damping impedance connected between the peaking element and the juncture of the capacitor and the adjustable impedance are further provided for increasingly damping the peaking element as the adjustable impedance is decreased to reduce the high-frequency content of the output signal.

The features of the invention which are believed to be novel are set forth with particularity in the appended claims. The organization and manner of operation of the invention, together with further objects and advantages thereof, may best be understood by reference to the following description taken in conjunction with the accompanying drawing which is a schematic diagram, partially in block diagram form, of a color television receiver including an embodiment of the amplifier of the present invention.

Referring to the drawing, composite monochrome or color television signals are received by an antenna 10 and fed to a tuner 11. The latter is selective of the individual television channel desired and provides radio-frequency amplification and frequency conversion of the selected signal to an intermediate frequency which signal is then further amplified in an IF amplifier 12. One portion of the amplified composite intermediate frequency signal is supplied to a detector 13 for the sound and synchronizing signal information. The sound or audio signals are amplified in conventional sound circuits 14 and supplied to a loudspeaker 15. Also in a conventional manner, the detected sync pulses are fed to synchronizing circuit 16 which serve to time the operation of scanning circuits 17. The latter develop horizontal and vertical scanning signals for the respective horizontal and vertical deflection coils 18, 19 mounted on the cathode-ray or picture tube 20.

The remainder of the composite intermediate-frequency signal is detected by a video detector 22 from which the detected monochrome signal is translated through a first video amplifier stage 23 and then a second video amplifier stage 24. Amplifier 24 supplies the monochrome or brightness signal to an input electrode of picture tube 20. A portion of the video signal detected by detector 22 is fed, in this instance through a blocking capacitor 26, to the color processing circuits 27. Color circuits 27 conventionally include a color amplifier which amplifies the color or chroma information and supplies the same to a synchronized color demodulator for developing signals representative of the hue and saturation in the reproduced image. These signals conventionally are in the form of color-difference signals which when added in picture tube 20 to the monochrome signal modulate the three electron beams in that tube with red, green and blue color information. Color circuits 27 receive a timing signal from scanning circuits 17 for controlling operation of the color synchronizing apparatus so that the color demodulators are timed only by "bursts" of timing signals received with the composite signal. Color circuits 27 also include a "color-killer" network operative to disable the color amplifiers in the absence of the bursts, as when a monochrome signal is being transmitted.

Also included in the illustrated color television receiver are all of the other conventional auxiliary circuitry. AGC circuits 30 respond to the detected horizontal sync pulse level to develop an automatic-gain-control voltage which is utilized in the normal manner to control the gain of tuner 11 and IF amplifier 12. Convergence circuits 31 modify the scanning waveforms obtained from scanning circuits 17 to develop convergence signals which are fed to suitable convergence coils 32 on picture tube 20. The convergence apparatus controls the beam-landing positions of the individual electron beams as the picture-tube raster is scanned, thereby insuring that the three beams produce red, green and blue pictures in geometric registry on the luminescent screen of the picture tube. Scanning circuits 17 also are coupled to high voltage circuits 33 which utilize the energy available from the deflection coils during retrace of the electron beams to develop a high-voltage potential which is supplied to picture tube 20. The receiver further includes a conventional low voltage power supply, indicated by the symbols B+ and B−, for supplying the necessary potentials to the various vacuum tubes or other amplifying devices utilized in the different stages.

The primary element in detector 22 is a diode 34. The detected video signal from its output side is fed through a radio-frequency decoupling network composed of series inductor 35 and shunt capacitor 36 which serve to prevent radiation of the intermediate frequency signal and its harmonics. The detected chroma information is taken off from the output side of inductor 35, and fed to color circuits 27. Also part of the detector output network is a shunt-connected peaking inductor 37 in series with a resistor 38. Following inductor 35 in the video channel is a bridged-T filter or trap for the 4.5 megacycle intercarrier beat signal between the sound carrier and the main carrier; this trap is composed of an inductor 39 in series in the video channel with inductor 35 and shunted from its midpoint to ground by a resistor 40, inductor 39 being bridged by a capacitor 41.

First video amplifier 23 takes the form of a cathode follower, its amplifying device being a triode vacuum tube 43 having an input or grid electrode 44, an anode or output electrode 45, and a cathode or common electrode 46. The designation "common" electrode is applied to cathode 46 because the circuitry is arranged so that both input-circuit and output-circuit signal currents traverse this electrode.

From the output side of detector 22 the detected video signal is fed to grid 44 through an input circuit comprising a peaking element or inductor 42 and a blocking capacitor 47. Viewed as a whole, detector 22 constitutes the input load impedance for amplifier 23. Conventional high-impedance grid-bias resistor 48 and 49 return grid 44 to ground, serving as a plane of reference potential, and to cathode 46, respectively. Direct-current operating potential is supplied to anode 45 from the positive terminal B+ of the low voltage power supply the negative terminal B− of which is returned to ground.

Video signals developed at cathode 46 are supplied over a series resistor 50 and through a delay line 51 to the input of second video amplifier 24. Proper output termination for delay 51 is afforded by the series combination of an inductor 52 and a resistor 53 connected from the delay-line output side to ground. The cathode-output impedance of cathode follower tube 43 together with resistor 50 serve to properly match the tube to delay line 51, providing a good sending-end delay line termination. Resistor 50, delay line 51, inductor 52 and resistor 53 together may be considered the output load impedance of triode 43.

As so far described in detail, the color television receiver is one which has performed admirably over a period of substantial use under ordinary conditions. The several different circuits which for present purposes need only a general discussion include many refinements and improvements which augment or enhance their performance. Of course, video amplifier 24 includes the usual brightness and contrast controls and picture tube 20 is associated with conventional circuitry for applying the proper potentials and biases to its several different electron gun elements. Improved contrast performance has beeen achieved by by-passing amplifier 23 for low frequencies with a path (not shown) conductive of direct-current signals; this feature is described and claimed in U.S. Letters Patent No. 2,999,897 issued Sept. 12, 1961 to Charles H. Heuer and John L. Rennick and assigned to the same assignee as is the present application. Alternatively, conventional D.C. restoration may be utilized in video amplifier 24 to obtain the same result.

Peaking coil 42, in cooperation with the input capacity of grid 44, establishes in the input circuit of triode 43 a condition of series resonance at a selected frequency within the passband of the amplifier stage. In a typical receiver, the resonant frequency is at about 2.5 megacycles. It therefore serves to enhance the band-pass characteristic over a fixed portion of the total range, in this case over the higher-frequency portion of the range and to a degree which enables the overall characteristic to have a desired normal response.

In accordance with the invention, video amplifier 23 is provided with means, serially comprising a capacitor and an adjustable impedance connected across the output load impedance of triode 43 for establishing an adjustable frequency-dependent shunt across the load impedance to vary the high frequency content of the output signal developed therein. To this end, in the illustrated embodiment a capacitor 60 is connected between cathode 46 and one end of a potentiometer 61, the tap of which is connected to ground. The value of capacitor 60 is selected so that, with the potentiometer tap moved to its position of minimum resistance in the network, portions of the video signal in the high end of the overall frequency range are shunted directly to ground and thereby generate reduced voltage across the output load. In further accord with the invention, additional means including a damping impedance connected between the input circuit peaking element and the juncture of the shunt-connected capacitor and the adjustable impedance is provided for increasingly damping the input circuit peaking element as the adjustable impedance is varied to reduce the high frequency content of the output signal. To this end, the juncture of potentiometer 61 and capacitor 60 is connected by means of a blocking capacitor 62 and a damping resistor 63 to the output end of inductor 42, at the junction between that inductor and blocking capacitor 47. Damping resistor 63 is selected to have an impedance value so that, when the tap on potentiometer 61 is adjusted to introduce minimum resistance into the network, damping resistor 63 acts to damp the action of peaking element 42 and thereby attenuate the response of the amplifier input circuit by an amount that cooperates with the high frequency attenuation simultaneously achieved by means of bypass capacitor 60 to achieve the desired result. With the illustrated circuit of detector 22, blocking capacitor 62 serves to prevent damping resistor 63 from constituting a change on the low-frequency load of diode 34 when adjustably inserted effectively in the network. Capacitor 62 may be omitted and resistor 63 connected directly to the top end of potentiometer 61 in the event the selected component values do not produce objectionable diode load changes.

Potentiometer 61 therefore serves as a user-operable peak-picture control. It simultaneously performs two correlated functions. When the tap on potentiometer 61 is moved toward its maximum resistance position (to the bottom in the drawing), the total impedance presented by the network it forms with capacitor 60 is high as compared to the shunt impedance to ground in the output circuit. Also when potentiometer 61 is set to introduce maximum resistance, damping resistor 63 is effectively returned to the cathode and in this condition presents no significant damping because the cathode in the illustrated cathode-follower circuit is at substantially the same signal voltage as is the grid. In consequence, neither capacitor 60 nor damping resistor 63 have significant effect with a maximum resistance inserted in the networks by potentiometer 61. As the amount of resistance introduced by potentiometer 61 is reduced, the respective high-frequency bypassing and damping effects of capacitor 60 and resistor 63 correspondingly increase. Potentiometer 61 together with capacitor 60 serve to "cut" the high-frequency portion of the video signal directly while the potentiometer in conjunction with resistor 63 serves to reduce the effectiveness of peaking coil 42 and thereby produce an overall result enhancing the concurrent action of bypass capacitor 60.

In a typical receiver, the video band-pass characteristic is selected to have a response, in terms of relative units of gain, of approximately 7, 10, 11 and 7 at 0, 1, 2 and 3 megacycles, respectively. Adjustment of potentiometer 61 permits changing the response from those values through a region where it is almost flat to a high-cut condition at which the response as a percentage of the foregoing is about 60% at 1 megacycle down to about 30% at 2 and 3 megacycles. As the amount of damping effect by resistor 63 is increased, the Q of peaking coil 42 is reduced with a resulting increase in the range of frequencies over which attenuation occurs.

As explained, a high-cut action is achieved in two parts of the circuit but with only one adjustment. Additionally, damping resistor 63 aids in preventing overload during the receipt of high-frequency information since, when the cathode network ceases to be degenerative for the high-frequency signals, due to bypassing action of capacitor 60, the grid circuit is damped to reduce the amplitude of the high-frequency signals fed to tube 43. Damping resistor 63 also minimizes the effect of change in input capacity with adjustment of potentiometer 61. While the input capacity does change, the damping of the series peaking circuit at the same time minimizes any reaction back on the second detector or on the color channel. The arrangement is particularly useful because all wiring to and from potentiometer 61 involves only the very low cathode impedance of the cathode-follower circuit.

Merely for the purpose of illustration and in no sense as a limitation, typical values for the significant components in a successful embodiment are as follows:

| | | |
|---|---|---|
| Inductor **42**, peaks signal at | mc | 2.5 |
| Resistor **63** | ohms | 10,000 |
| Capacitor **47** | μf | .01 |
| Resistor **48** | megohms | 2.2 |
| Resistor **49** | do | 1.0 |
| Capacitor **62** | μμf | 50 |
| Potentiometer **61** | ohms | 5,000 |
| Capacitor **60** | μμf | 470 |
| Resistor **50** | ohms | 1,200 |
| Resistor **53** | do | 1,500 |
| Inductor **52** | μh | 42 |
| Tube **43** | | ½6HL8 |

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A cathode-follower amplifier stage comprising:
- an amplifier device having an input, an output and a common electrode;
- input circuit means including a peaking element coupled to said input electrode for applying a signal to said amplifier device, said peaking element establishing a condition of resonance in said circuit means to accentuate a predetermined portion of the frequency spectrum of said applied signal;
- an output load impedance connected between said common electrode and a plane of reference potential for deriving an output signal from said amplifier;
- means serially comprising a capacitor and an adjustable impedance connected across said output load impedance for establishing an adjustable frequency-dependent shunt across said output load to vary the high-frequency content of said output signal;
- and means including a damping impedance connected between said peaking element and the juncture of said capacitor and said adjustable impedance for increasingly damping said peaking element as said adjustable impedance is decreased to reduce the high-frequency content of said output signal.

2. An amplifier stage as described in claim 1 wherein said amplifier device is a triode vacuum tube, said input electrode is a control grid, said common electrode is a cathode and said output electrode is an anode.

3. An amplifier stage as described in claim 1 wherein said peaking element is an inductance serially connected between the source of said applied signal and said input electrode.

4. An amplifier stage as described in claim 3 wherein said impedances are resistors and said peaking element damping means includes a DC blocking capacitor serially connected with said damping impedance between said peaking element and said juncture of said adjustable impedance and said shunt capacitor.

References Cited

UNITED STATES PATENTS

| | | | |
|---|---|---|---|
| 2,207,933 | 7/1940 | Mountjoy | 330—172 X |
| 2,255,882 | 9/1941 | Hathaway et al. | 330—172 X |
| 3,278,854 | 10/1966 | Ko-Hsin Liu | 330—172 X |

ROY LAKE, *Primary Examiner.*

N. KAUFMAN, *Assistant Examiner.*